United States Patent [19]

McNeil

[11] E . Re. 30,344

[45] Reissued Jul. 22, 1980

[54] ROUND TRAMPOLINE

[75] Inventor: Harold L. McNeil, Tallahassee, Fla.

[73] Assignee: Temple Baptist Church, Tallahassee, Fla. ; a part interest

[21] Appl. No.: 893,350

[22] Filed: Apr. 4, 1978

Related U.S. Patent Documents

Reissue of:

[64] Patent No.: 3,948,515
Issued: Apr. 6, 1976
Appl. No.: 457,555
Filed: Apr. 3, 1974

[51] Int. Cl.[2] ..... A63B 5/00

[52] U.S. Cl. ..... 272/65; 182/139

[58] Field of Search ..... 272/65, 136, 138, 142, 272/109, 76, 134; 182/139

[56] References Cited

U.S. PATENT DOCUMENTS

| | | | |
|---|---|---|---|
| 2,370,990 | 3/1945 | Nissen | 272/65 |
| 2,991,841 | 7/1961 | Sampson et al. | 272/65 |
| 3,767,192 | 10/1973 | Ericksson | 182/139 X |

FOREIGN PATENT DOCUMENTS

| | | | |
|---|---|---|---|
| 638735 | 3/1958 | Canada | 272/65 |

*Primary Examiner*—William R. Browne
*Attorney, Agent, or Firm*—Harvey B. Jacobson; Clarence A. O'Brien

[57] ABSTRACT

A round trampoline having a sectional, substantially circular frame to which a circular mat is resiliently attached to the frame by a plurality of radially arranged springs. The mat comprises a pair of strips arranged perpendicularly to one another to form a reinforced center jumping area. The frame sections advantageously fit together in a double joint arrangement which affords great rigidity to the structure. *The trampoline has sections forming the annular frame which are detachably connected to each other. At the ends of each section there is a portion of a generally U-shaped support member attached thereto and which extends downwardly below the frame rail. The portions of the generally U-shaped support that extend below the frame are detachably connectable with each other and secure the connection of the sections when joined with each other.*

7 Claims, 15 Drawing Figures

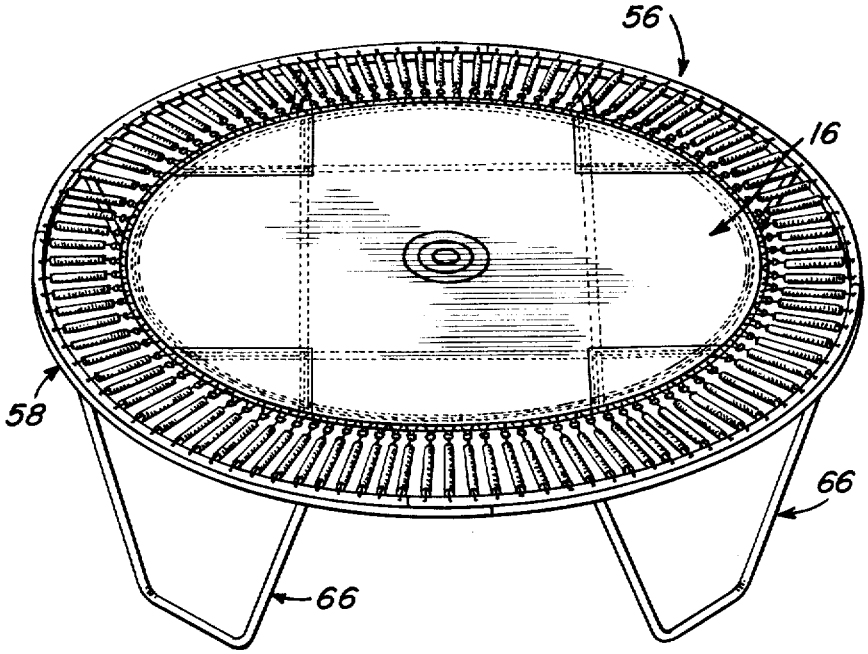
Fig. 11
Fig. 12
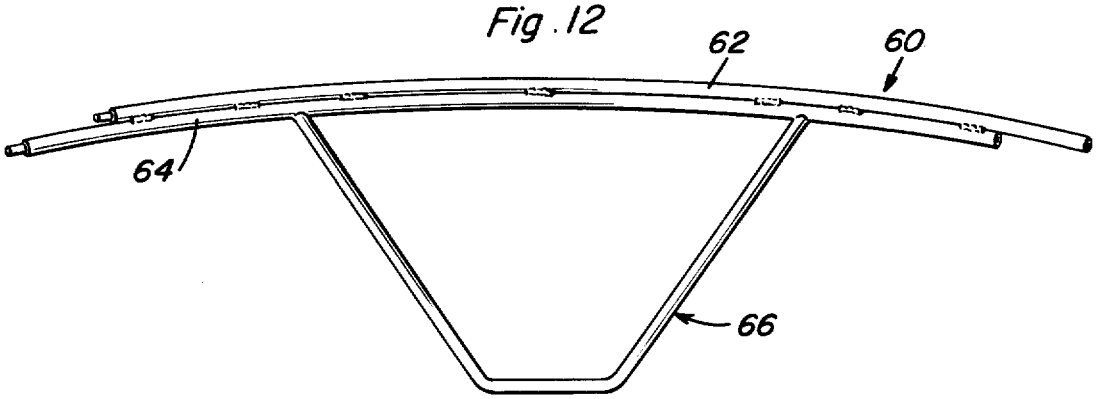
Fig. 13
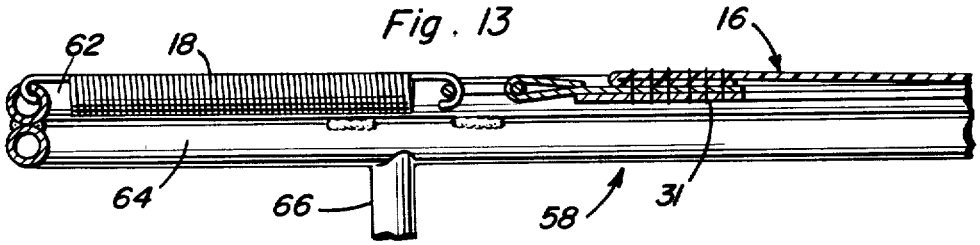
Fig. 14
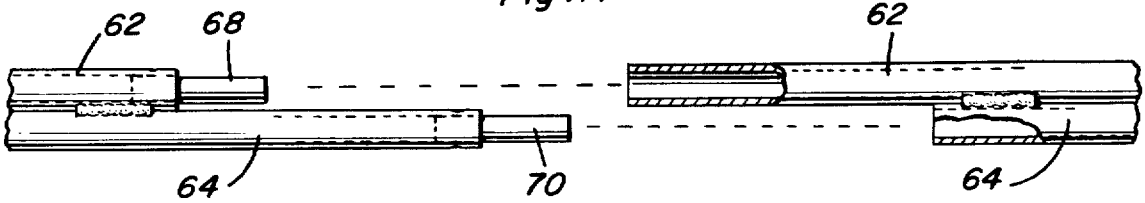

ROUND TRAMPOLINE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to play and gymnastic appliances, and particularly to a round trampoline.

2. Description of the Prior Art

The conventional rectangular trampoline creates difficulties in that the unequal distributions of stress on the periphery of the mat makes it almost impossible to maintain the mat in proper tension. Not only does this improper tension make the balance of the mat unpredictable and dangerous, but increases the wear and shortens the life of the mat as well.

In order to overcome the inherent drawback to the rectangular trampoline, round or circular trampolines have been proposed. See, for example, U.S. Pat. Nos. 3,767,192, issued Oct. 23, 1973 to M. E. Eriksson, and 3,031,688, issued May 1, 1962 to D. R. Southwood.

SUMMARY OF THE INVENTION

It is an object of this invention to provide a round trampoline having an improved frame affording simple yet rigid construction.

It is another object of the present invention to provide a round trampoline having a frame formed by a plurality of sections so that the frame may be broken down into its sections for facilitating handling and storage of the frame.

It is still another object of the present invention to provide an improved mat for a round trampoline which will afford optimum stress distribution and reinforcement.

These and other objects are achieved according to the present invention by providing a round trampoline having: a sectional, substantially circular frame; leg sections associated with the frame section for supporting the frame on a support surface; coupling arrangements for connecting the sections together; a mat; and a plurality of springs for connecting the mat to the frame.

One preferred frame according to the present invention is formed by a plurality of sections including a single rail adjacent the ends of which is attached one leg and a portion of the base of a leg section. These leg section halves are arranged to cooperate when the rail of a respective frame section is connected to the rail of another frame section so as to form a complete U-shaped leg section. Connection of the frame sections both at the adjoining rails and at the adjoining base portions of the leg section provides for a rigid structure resistant to rotation about the bases of the leg sections.

Another preferred frame construction according to the present invention includes a plurality of frame sections each formed by a pair of arcuate rails connected together to form a double rail frame. One of the rails is staggered with respect to the other rails in order to form a staggered joint with the rails of an adjoining frame section. This arrangement will lock the joint and prevent rotation or flexation of adjoining frame sections. The leg sections of this embodiment may be in the form of complete U-shaped structures provided one or more to each frame section.

An advantageous feature of the present invention is the provision of a mat which includes a pair of perpendicular strips. The perpendicular arrangement of the strips forms a heavily reinforced jumping area in the center of the mat.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 11 is a perspective view showing another preferred embodiment of a trampoline according to the present invention.

FIG. 12 is a perspective view showing one section of the frame of the trampoline shown in FIG. 11.

FIG. 13 is a fragmentary, vertical sectional view showing a section of the frame of FIG. 11, drawn to a larger scale.

FIG. 14 is an exploded, side elevational view, partly cut away and in section, showing the manner of coupling adjacent sections of the frame shown in FIGS. 11-13.

DESCRIPTION OF THE PREFERRED EMBODIMENT

Figure 1:
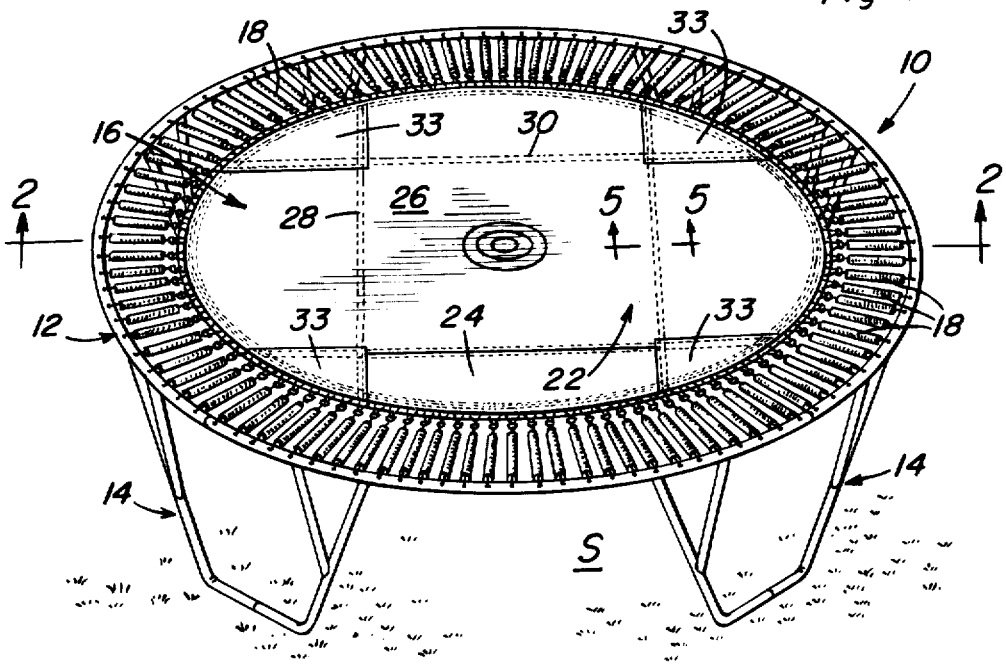
FIG. 1 is a perspective view showing a preferred embodiment of a round trampoline according to the present invention.
Figure 2:
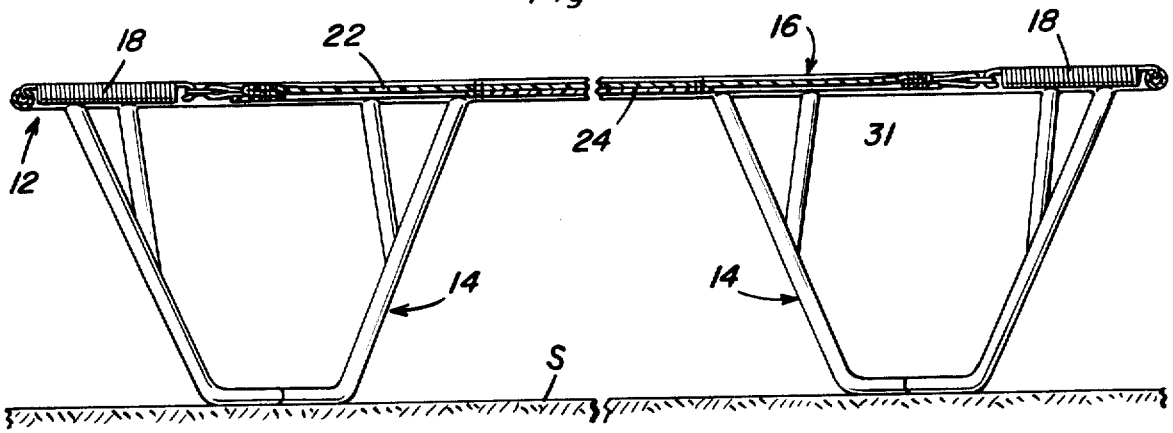
FIG. 2 is a sectional view taken generally along the lines 2—2 of FIG. 1.
Figure 3:
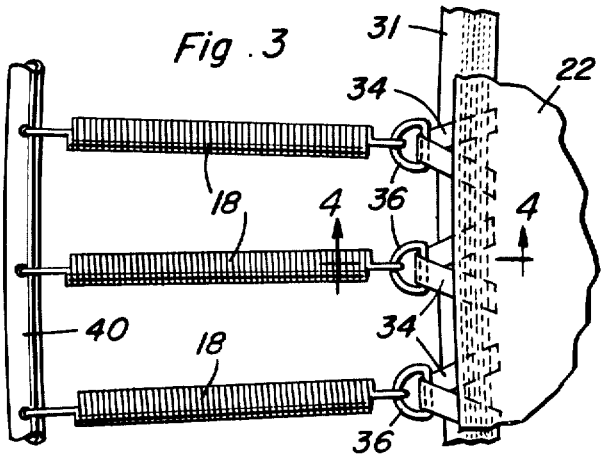
FIG. 3 is a fragmentary, top plan view of the trampoline of FIGS. 1 and 2.
Figure 4:
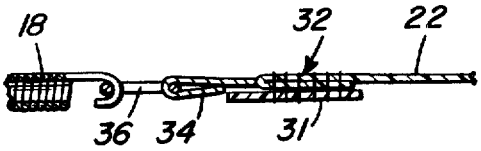
FIG. 4 is a fragmentary, sectional view taken generally along the lines 4—4 of FIG. 3.

Referring now more particularly to FIGS. 1 and 2 of the drawings, a trampoline 10 according to the present invention has a sectional, substantially circular frame 12 provided with leg sections 14 which support frame 12 on a suitable support surface S. A substantially circular mat 16 is resiliently mounted within frame 12 as by a plurality of coiled springs 18. Proper placement of springs 18 radially around frame 12 causes a jumper's (not shown) weight to be evenly distributed to all of the springs 18 with resulting longer spring life and the elimination of over stretching at the sides of mat 16. Further, this arrangement will provide a natural physical action for moving a jumper toward the center of mat 16 due to the spring tension in all springs 18 being less when the bias on mat 16 is closest to the center thereof. Because of this arrangement, a jumper has better body control due to the even distribution of a jumper's weight to all of the springs 18.

Mat 16 includes a pair of strips 22 and 24 each having ends thereof curved to the same radius of the mat. The strips 22 and 24 are arranged perpendicular to one another for providing center jumping area 26. Those edges of strips 22 where same is either adjacent to or traverses the other of the strips are advantageously stitched as shown at 28 and 30 in order to stabilize the mat. Advantageously, stitching 28 and 30 is a double stitching made with, for example, heavy duty nylon thread, and the like. As can be readily appreciated from FIG. 1, jumping area 26 is thus reinforced by a double thickness of strips 22, 24.

Figure 5:
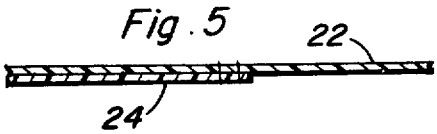
FIG. 5 is a fragmentary, sectional view taken generally along the lines 5—5 of FIG. 1.

Referring now to FIG. 5 of the drawings, the perimeter of mat 16 is advantageously a backing ring 31 arranged around the periphery thereof and is anchored to the end portion of strips 22, 24 as by suitable stitching 32. This stitching 32 may be, for example, six rows of high density nylon thread, and the like. Filler pieces 33 are stitched to the strip and ring to complete the mat. About ring 31 is arranged a plurality of straps 34 each provided with a conventional D-ring 36 arranged for receiving one hook-end of springs 18. Ring 33 helps hold straps 34 in place. The other hook-end of springs 18 is arranged in a respective hole 38 provided in rail 40 of frame 12. Although it is to be understood that the materials used may vary in dependence on specific circumstances, vinyl covered nylon of 22 ounces per yard combined with strips 22, 24 constructed from mesh polypropalene 8.40 rated at 1220 pounds per square inch has been found satisfactory for a mat 16 having a diameter of approximately 11 feet.

Figure 6:
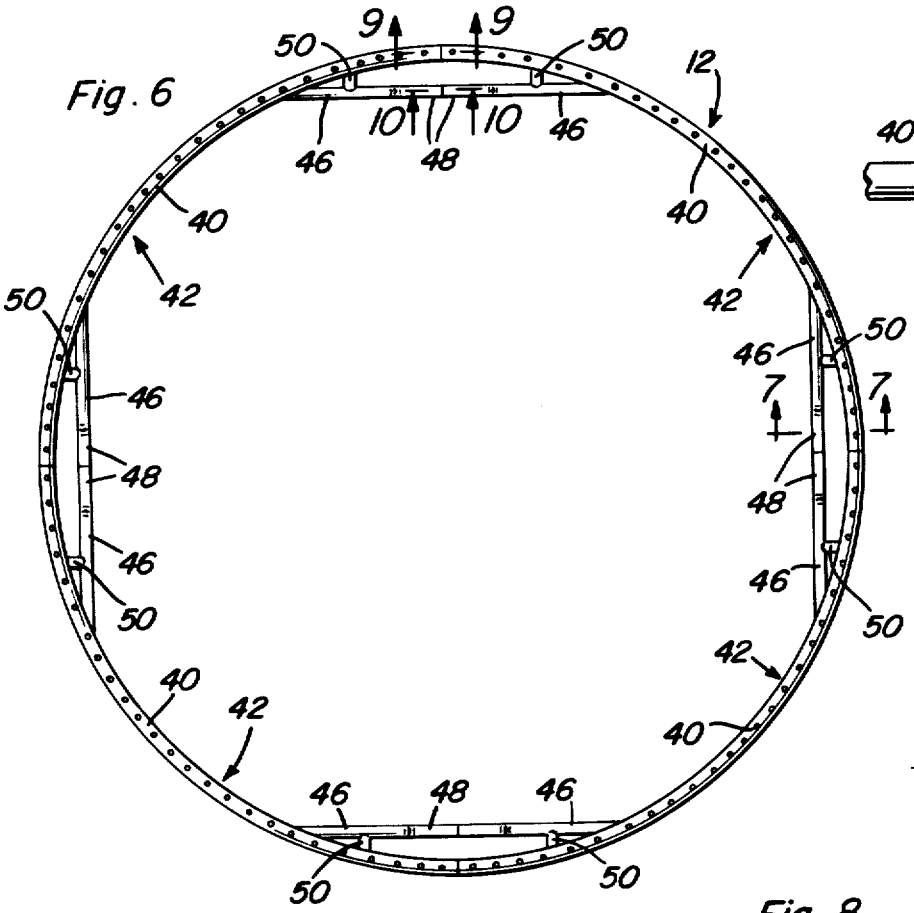
FIG. 6 is a top plane view showing the frame of the trampoline of FIG. 1.
Figure 7:
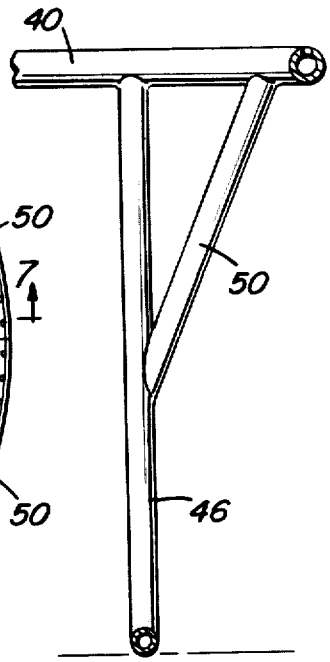
FIG. 7 is a fragmentary, sectional view taken generally along the lines 7—7 of FIG. 6.
Figure 8:
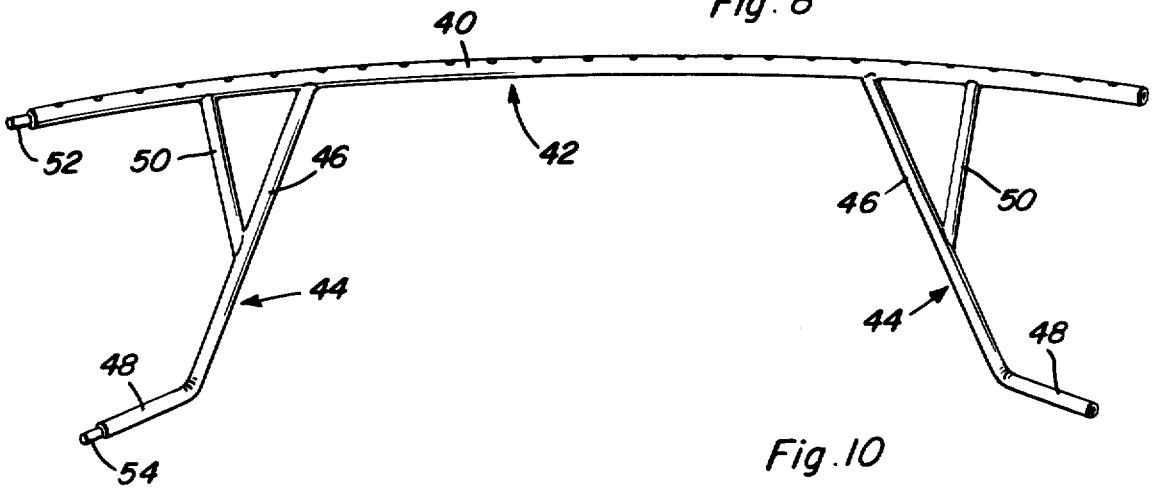
FIG. 8 is a perspective view showing a single section of the frame shown in FIG. 6.

Frame 12 is the rail 20 advantageously formed from, for example, four equal, arcuate sections 42, which may be referred to as quarter sections. Each section 42 is provided adjacent the longitudinally spaced ends thereof with a part 44 of a leg section 14. Each part 44 extends substantially vertically downward from frame 12 and has a leg 46 terminating in a base portion 48. A vertical leg brace 50 completes part 44. These elements are best seen from FIGS. 6–8 of the drawings.

Each leg section 14 is advantageously a U-shaped supporting member which extends substantially vertically, or straight down, from rail 40 of frame 12. This orientation allows the base of the section 14, the base being that portion formed by the cooperative mating of a pair of base portions 48, to be inside the circumference of frame 12 for better support.

Figure 9:
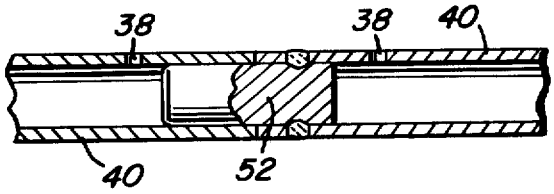
FIG. 9 is a fragmentary, sectional view taken generally along the lines 9—9 of FIG. 6.
Figure 10:
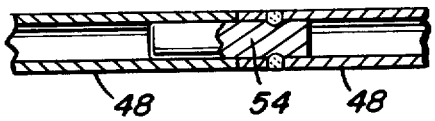
FIG. 10 is a fragmentary, sectional view taken generally along the lines 10—10 of FIG. 6.

Tubes 52 (FIG. 9) and 54 (FIG. 10) are retained in the respective open ends of rail 40 and base portion 48 in a suitable manner, such as by the illustrated welds permitted by holes made in the pipe forming the respective rail and base portion. These tubes 52, 54 will penetrate the open end of a rail and base portion of frame section 42 paired with the frame section 42 provided with the tubes. In this manner, the tubes 52, 54 provide a coupling which forms a male-female joint. The key to construction of a round frame 12 according to the present invention depends on the ability to stabilize the joint of the top rail 40. The divided leg union anchors rail 40 and prevents rotation and flexation thereof. The joints are advantageously in a common vertical plane, with the joint formed in the leg section base being substantially midway between the juncture of legs 46 with base portion 48. The base of the leg sections 14 is substantially planar.

FIGS. 11–14 of the drawings show an alternative embodiment of a trampoline according to the present invention. This trampoline, designated 56 has a frame 58 divided into a plurality of frame sections 60, each formed by a pair of adjacent and co-extending rails 62 and 64. There are, for example, four sections as in frame 12, with the arcuate rails 62, 64 connected together to form a double rail. One of the rails 62, 64 is staggered with respect to the other of the rails 64, 62 in order to form a staggered joint with an adjoining frame section 60 and to lock the joint and prevent rotation or flexation of the adjoining section. Each frame section 60 is advantageously provided with a U-shaped leg section 66 affixed to the frame section in a suitable commonly known manner.

Frame sections 60 are advantageously connected together by malefemale couplings formed by tubes 68 and 70 in a manner similar to the formation of couplings by tubes 62 and 64. This double rail coupling arrangement with staggered joints prevents rotation of the quarter sections 60 and accordingly of the entire frame 58. The design and placement of leg section 66 given balance support to the quarter section 60, and once again to the frame 58. Frame 58 permits heavier construction than frame 12, providing a trampoline 56 better suited for commercial applications and the like.

Figure 15:
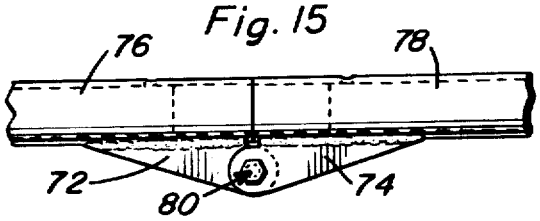
FIG. 15 is a fragmentary, sectional view similar to FIG. 9 but showing a modified frame connection.

FIG. 15 shows a modification, which may be used with either frame 12 or 58, having a pair of lugs 72 and 74 affixed to frame rails 76 and 78 in a conventional manner, such as welding, and provided with mating holes arranged for receiving a, for example, bolt and nut 80 to lock together rails 76, 78 in such a manner as to ensure prevention of rotation of the frame section.

As can be appreciated from the above description and the drawings, a round trampoline according to the present invention is much safer than conventional rectangular trampolines because the side rails have been moved but to the full diameter of a circle. Accordingly, the mat will last longer due to a more even distribution of stresses at the edge thereof. Further, the round design of the trampoline frame makes bracing and reinforcing unnecessary. The even pull to the center of the mat during stress thereon allows the frame to remain still or steady. The spring tension on the round frame pulls together the joints coupling the frame sections so tightly that it practically eliminates squeaks and frame noise. While the trampoline may be set up for a full number of springs around the circumference thereof, as shown in FIGS. 1 and 11, it is possible to eliminate by selective removal certain diametrically opposite springs in order to decrease the resilient force acting on the mat. While the number of springs employed may vary with the size and desired resiliency of the trampoline, for example, 100 springs have been found satisfactory for use with a trampoline having a diameter of approximately 13 feet.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A round trampoline, comprising, in combination:

a. a sectional, substantially circular frame, the frame including a plurality of sections each formed by a pair of arcuate rails connected together to form a double rail, one of the rails staggered with respect to the other of the rails in order to form a staggered joint with an adjoining frame section and to lock the joint and prevent rotation or flexation of the adjoining sections;

b. leg means provided on the sections of the frame for supporting the frame on a support surface;

c. fastener means connecting the sections of the frame together;

d. a mat; and e. resilient means for connecting the mat to the frame.

2. A structure as defined in claim 1, wherein the leg means includes U-shaped leg sections, with each frame section having a one of the leg sections affixed thereto.

3. A structure as defined in claim 2, wherein the fastener means includes a male-female coupling at each meeting point of adjacent rails.

*4. A substantially round trampoline comprising a sectional, substantially annular frame including a frame rail formed by a plurality of sections, means joining the ends of adjacent sections, each section being detachably connected to the adjacent section and having depending therefrom leg portions, one leg portion detachably connected to a leg portion of the adjacent section so as to form a generally U-shaped trampoline support underlying the frame, a mat attached to the frame for projecting a person, the depending leg portions having upper ends rigidly connected with the frame rail sections in substantially equal longitudinally spaced relation to the joint between adjacent sections of the frame rail for preventing relative rotation between adjacent sections of the frame rail and preventing lateral bending of the frame rail the lower ends of the leg portions being detachably connected to one another; said U-shaped support bridging the joint between adjacent rail sections, bight portions of the legs forming the sole support for the trampoline and being generally in alignment with the frame rail, and means releasably joining the sections of the legs to enable assembly and disassembly of the frame rail sections and the leg portion so that when disassembled each section will have rigidly attached thereto a leg portion at each end thereof.*

*5. The structure as defined in claim 4 said mat being supported within said annular frame, said mat being substantially concentric with respect to the frame, a plurality of radial springs of equal length and equally spaced circumferentially between the mat and frame, said mat being constructed of a pair of perpendicular intersecting strips of flexible, fabric like material, thereby providing a dual thickness central jumping area, said springs exerting an inward force on said frame rail sections forming the sole means to retain the sections in assembled relation, said upper ends of the U-shaped leg being rigid with adjacent rail sections of the frame rail for preventing outward expansion of the frame rail.*

*6. The structure as defined in claim 4 wherein bight portions of the legs are spaced from each other circumferentially of the frame rail with bight portions being completely independent of each other and unconnected with the area circumferentially between and transversely between bight portions of the legs being devoid of obstructions.*

*7. A round trampoline comprising a sectional, substantially circular frame including a frame rail formed by a plurality of arcuate sections, means joining the ends of adjacent sections, a substantially rigid U-shaped leg underlying the frame rail and bridging the joint between each pair of adjacent sections with the U-shaped leg including upper ends rigidly affixed to adjacent sections of the frame rail in longitudinally spaced relation to the joint between adjacent sections of the frame rail for preventing relative rotation between adjacent sections of the frame rail and preventing lateral bending of the frame rail, each U-shaped leg including a pair of downwardly converging leg portions extending rigidly from the frame rail with the lower ends of the leg portions being interconnected by a bight portion bridging the joint between adjacent rail sections, the bight portions of the legs forming the sole support for the trampoline and being generally in alignment with the frame rail, said frame rail sections and legs being tubular, said means joining the ends of adjacent arcuate sections including a plug rigid with one of said frame sections and snugly telescoped into the end of an adjacent frame section, and a mat supported within said circular frame, said mat being substantially circular and concentric with respect to the frame, a plurality of radial springs of equal length and equally spaced circumferentially between the mat and frame, said mat being constructed of a pair of perpendicular intersecting strips of flexible, fabric like material, each strip having a width of approximately one-half of the diameter of the frame rail thereby providing a dual thickness central jumping area, the portion of the mat exteriorly of the central jumping area being of mesh construction to enable passage of air therethrough to prevent ballooning of the mat, and filler pieces of fabric like material connected to the side edges of the strips outwardly of the jumping area and combining with the strips to form a circular mat, said strips being of mesh polypropylene and the filler pieces and strips being stitched together along the side edges thereof, said springs exerting an inward force on said frame rail sections forming the sole means to retain the sections in assembled relation, said upper ends of the U-shaped leg being rigid with adjacent rail sections of the frame rail for preventing outward expansion of the frame rail.*

* * * * *